United States Patent [19]

Kiyama et al.

[11] Patent Number: 5,071,315
[45] Date of Patent: Dec. 10, 1991

[54] WINDSCREEN WASHER PUMP FOR VEHICLE

[75] Inventors: Masaaki Kiyama, Kosai; Takeshi Kamimura, Hamamatsu, both of Japan

[73] Assignees: Asmo Co., Ltd., Shizuoka; Nippondenso Co., Ltd., Aichi, both of Japan

[21] Appl. No.: 558,294

[22] Filed: Jul. 26, 1990

[30] Foreign Application Priority Data

Jul. 31, 1989 [JP] Japan ............... 1-90035[U]
Jul. 31, 1989 [JP] Japan ............... 1-198518

[51] Int. Cl.$^5$ .................. F01D 1/30; F03B 1/04
[52] U.S. Cl. ..................... 415/152.1; 415/144
[58] Field of Search .......... 415/150, 152.1, 152.2, 415/910, 144, 145

[56] References Cited

U.S. PATENT DOCUMENTS

| 926,748 | 7/1909 | Kelly | 415/152.1 |
|---|---|---|---|
| 4,284,386 | 8/1981 | Hudson | 415/144 |
| 4,650,404 | 3/1987 | Kusakawa | . |
| 4,679,983 | 7/1987 | Pietryk et al. | 415/152.2 |
| 4,838,488 | 6/1989 | Heier et al. | 415/152.2 |
| 4,900,235 | 2/1990 | Perkins et al. | 415/146 |
| 4,919,591 | 4/1990 | Kamimura | 415/152.1 |

FOREIGN PATENT DOCUMENTS

| 0166104 | 2/1986 | European Pat. Off. . |
|---|---|---|
| 8620253 | 11/1986 | Fed. Rep. of Germany . |
| 2377911 | 8/1978 | France . |
| 398321 | 3/1966 | Switzerland . |

Primary Examiner—Edward K. Look
Assistant Examiner—Thomas Denion
Attorney, Agent, or Firm—Venable, Baetjer, Howard & Civiletti

[57] ABSTRACT

A pump used to selectively force-feed under pressure washer fluid to the front and rear windscreens of a vehicle according to the rotation of an impeller in either one or other direction. A bypass flow passage for taking out part of the washer fluid, which is forcibly fed under pressure by means of the impeller, is formed upon supply of the washer fluid to the rear windscreen. Thus, the washer fluid delivered to the front windscreen and that delivered to the rear windscreen are different in the delivery rate.

20 Claims, 10 Drawing Sheets

WINDSCREEN WASHER PUMP FOR VEHICLE

BACKGROUND OF THE INVENTION

1. Field of the Invention

The present invention relates to a windscreen washer pump, and particularly to a washer pump for use with a vehicle, which serves to supply washer fluid to two systems for the windscreen.

2. Description of the Related Art

There has widely been used to date vehicles of the two wiper type each of which is provided with two wipers both on the front and rear sides. In a two-wiper type vehicle, it is preferable to differentiate between the delivery pressure of washer fluid to the front glass and that of the washer fluid to the rear glass, both glasses being subjected to the various influences such as wind pressure or the like. It is especially preferable to supply washer fluid at high delivery pressure to the front glass which is susceptible to wind pressure or the like and to supply washer fluid at low delivery pressure to the rear glass which is less susceptible to the wind pressure.

Thus, two washer pumps having different delivery pressure are mounted on a conventional vehicle and the washer fluid is supplied to the front and rear glasses with different delivery pressure by using the respective washer pumps.

However, the use of two different pumps for the supply of washer fluid to the two systems not only incurs an increase in manufacturing cost but trouble often develops on the positions where the two pumps are located.

Accordingly, it has heretofore been proposed to selectively supply washer fluid to the front and rear sides by using a single washer pump (Japanese Patent Laid-Open No. 60-6096).

However, the prior art is accompanied by the problem that the delivery pressure of washer fluid to the front side is not differentiated from that of the washer fluid to the rear side, although there is no problem from the standpoint of manufacturing cost and the position where two washer pumps are employed.

Thus, when the delivery pressure of the washer pump is set to a higher value in relation to the front glass, the delivery pressure of the washer fluid to the rear glass is so high that a reduction in efficiency takes place due to the spray of the fluid or the like. On the other hand, when the delivery pressure of the washer pump is set to a lower value in relation to the rear glass, a substantial quantity of washer fluid cannot be supplied to the front glass. In particular, when the wind pressure is high as in the case where the vehicle is running at high speed, the landing point of the washer fluid onto the front glass varies correspondingly and hence the wiping ability of the front glass is deteriorated.

SUMMARY OF THE INVENTION

With the foregoing problems in view, it is therefore an object of the present invention to provide a washer pump for use in a vehicle, which can supply washer fluid to two systems with a single pump and at the different delivery pressures.

The washer pump according to the present invention comprises a pressurized mechanism which can pressurize the washer fluid from a washer fluid supply source so as to deliver the same therefrom and also can change the delivery of the washer fluid in two directions, a first valve operative to be opened according to the delivery of the washer fluid from the pressurized mechanism in one direction for introducing the pressurized washer fluid onto a first window glass, a second valve operative to be opened according to the delivery of the washer fluid from the pressurized mechanism in the other direction for introducing the pressurized washer fluid onto a second window glass, and bypass means serving to take out part of the washer fluid delivered in the one direction for reducing the delivery rate of the washer fluid to the first window glass below that of the washer fluid to the second window glass.

Thus, the delivery rate of the washer fluid from the pressurized mechanism in the one direction can be reduced as compared to that of the washer fluid therefrom in the other direction in spite of there being a single pump.

The bypass means can be applied to both cases, one for where it is mounted on the pressurized mechanism and the other for where it is provided between the pressurized mechanism and each of the washer fluid injection nozzles. When the pressurized mechanism is provided with a pressurized flow passage formed by a pump chamber and an impeller, the pressurized washer fluid is taken out from a portion closer to an outlet for discharging the washer fluid onto the first window glass rather than an outlet for discharging the washer fluid onto the second window glass. When the bypass means is provided at the portion other than the pressurized mechanism, part of the pressurized washer fluid is taken out from a guide passage formed between the pressurized mechanism and an injection nozzle provided adjacent to the first window glass.

DETAILED DESCRIPTION OF THE PREFERRED EMBODIMENTS

Figure 2:
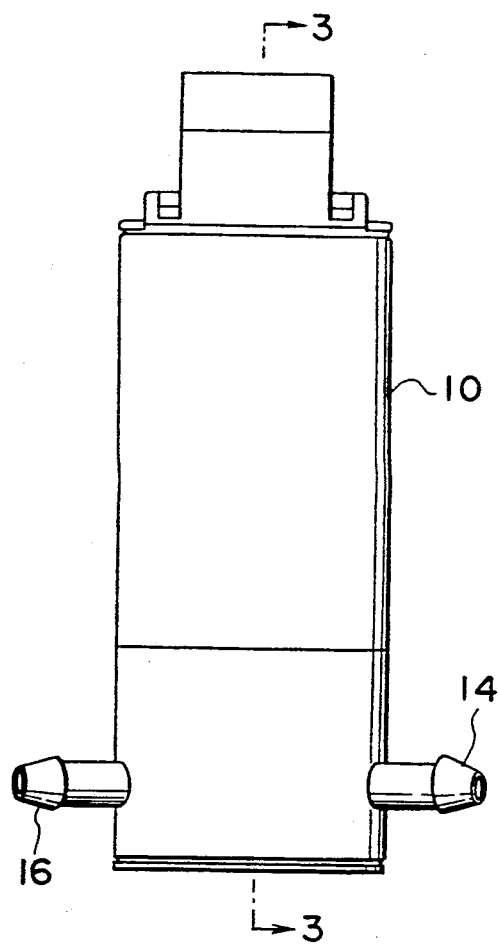
FIG. 2 is a side view showing the overall structure of the washer pump to which the present invention is applied.
Figure 3:
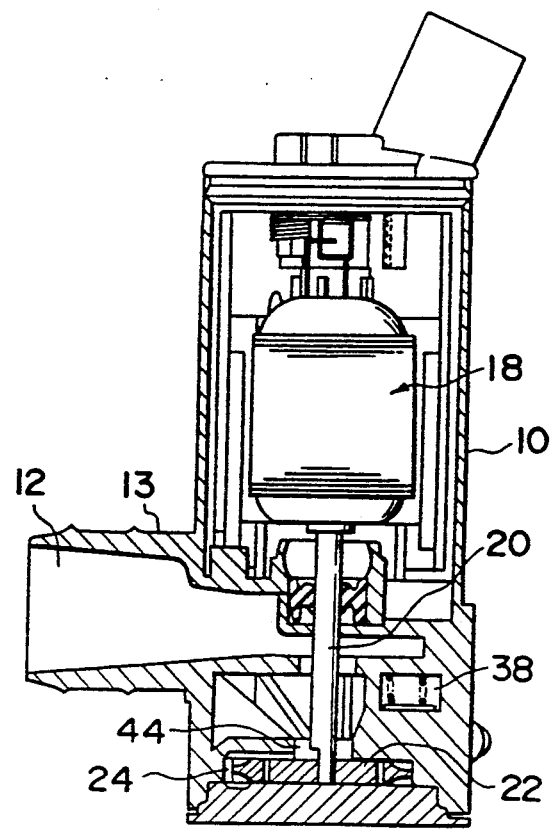
FIG. 3 is a cross-sectional view taken along line 3—3 of FIG. 2.

FIG. 2 illustrates the complete exterior of a washer pump for a vehicle, to which a first embodiment of the present invention is applied. FIG. 3 depicts a sectional schematic illustration taken along line 3—3 of FIG. 2.

As shown in FIGS. 2 and 3, the washer pump according to the first embodiment is provided with a cylinder 13 projected from the outer peripheral wall of a housing 10 formed in a substantially cylindrical fashion and having an intake hole, i.e., an inlet 12 formed therein and connected to an unillustrated washer fluid supply tank. In addition, the washer pump is also provided with a first cylindrical outlet 14 communicating with a nozzle disposed at a rear glass of the vehicle and a second cylindrical outlet 16 communicating with a nozzle disposed at a front glass, at the outer peripheral wall adjacent to the lower part of the housing 10.

As illustrated in FIG. 3, a rotor of a motor 18 is contained in the upper part of the housing 10, while a pump chamber 24 accommodating an impeller 22 is formed in the lower part thereof. In addition, a rotary shaft 20 of the rotor 18 is attached to the central portion of the impeller 22.

Washer fluid, which is to be supplied to the pump via the inlet 12, is fed to the side of the rear glass from the first outlet 14 at a given delivery pressure by allowing the motor 18 to drive the impeller 22 in the forward direction, whereas the washer fluid is supplied to the side of a front glass from the second outlet at a given delivery pressure by driving the impeller 22 in the reverse direction.

Figure 4:
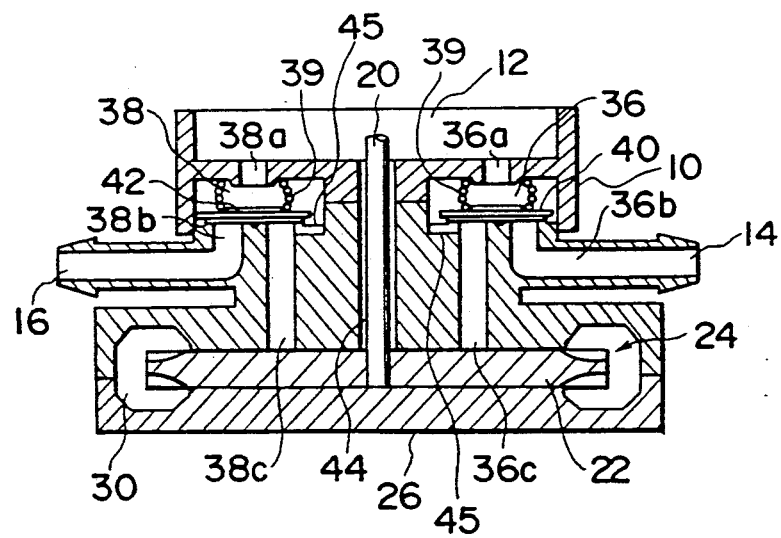
FIG. 4 is an assembly diagram of the principal portion thereof shown in FIG. 1.
Figure 5:
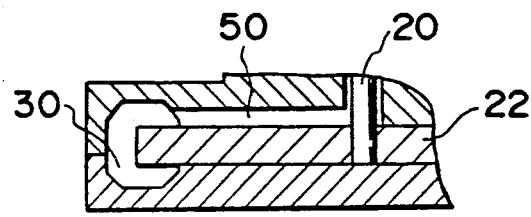
FIG. 5 is a cross-sectional view showing part of the principal portion thereof shown in FIG. 4, with a part being cut at a portion where a bypass flow passage is formed.

FIG. 4 shows a schematic cross-sectional view of the lower part of the washer pump shown in FIG. 3, especially the pump chamber 24.

The pump chamber 24 according to the present embodiment is formed between the housing 10 and a cap 26 by fitting the cap 26 onto the bottom of the housing 10 thus defining an upper half portion of the pump chamber 24 in a state where the impeller 22 is accommodated.

FIG. 1 shows an exploded view of the pump chamber portion depicted in FIG. 4. In the same drawing, FIG. 1(A) is a cross-sectional view of a housing bottom portion formed with the upper half portion of the pump chamber 24. FIG. 1(B) is a bottom view of the bottom face 28 of the pump chamber 24 shown in FIG. 1(A). In addition, FIG. 1(C) is a cross-sectional view of the impeller and FIG. 1(D) is a cross-sectional view of the cap 26.

As shown in FIGS. 1 and 4, a flow channel 30 through which washer fluid flows along the outer periphery of the pump chamber 24 is formed in a ring form within the pump chamber 24. The flow channel 30 employed in the present embodiment includes a ring-shaped concave groove 32 formed in the vicinity of the outer periphery of the bottom face 28 of the pump chamber 24 and a ring-shaped concave groove 34 formed in the top face of the cap 26 opposed to the concave groove 32.

Figure 6:
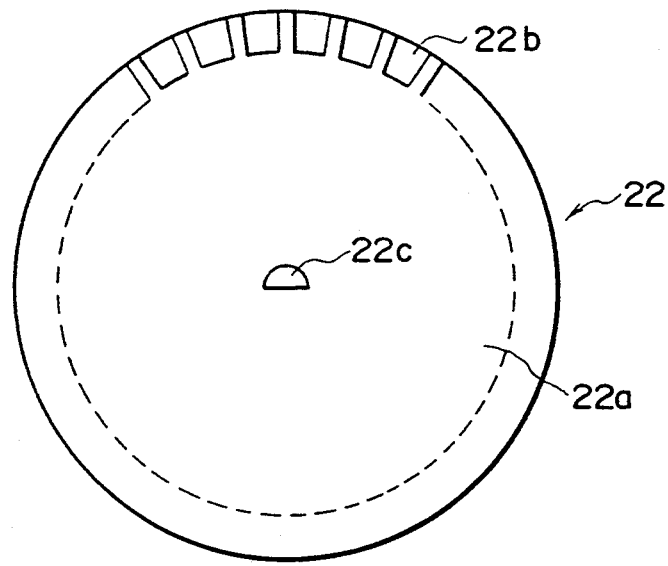
FIG. 6 is a plan view of an impeller.

As shown in FIG. 6, the impeller 22 employed in the present embodiment is formed with a half-moon aperture 22c with an aperture, which is brought into engagement with the rotary shaft 20 of the motor 18 in the central portion of a disc 22a, and grooves 22b defined at regular intervals along the outer periphery of the impeller 22. The grooves 22b are formed to be rotated and driven along the flow channel 23 of the pump chamber 24. As shown in FIG. 4, the interval between the impeller 22 and both side walls of the pump chamber 24, i.e., between the bottom face 28 of the housing 10 and the top face of the cap 26 is very narrow.

As illustrated in FIG. 4, inside the housing 10 a first valve chamber 36 and second valve chamber 38 are located between the inlet 12 and the pump chamber 24.

The first valve chamber 36 is formed with a communication hole 36a communicating with the inlet 12 at the upper part thereof. A communication hole 36b communicates with the first outlet 14 at the lower part thereof and a communication hole 36c communicates with one end side of the flow channel 30, all of which are perforated in parallel to the rotary shaft 20 of the motor 18.

Provided within the valve chambers 36, 38 are valves 40, 42 which are always biased downwards by means of compression coil springs 39 and designed to block the communication holes 36b, 38b from communicating with the first and second outlets 14, 16. Each of the cut-away portions 45 is partly formed at the peripheral edge of the aperture of each of the communication holes 36c, 38c communicating with the valve chambers 36, 38 in a direction in which the area of the aperture is enlarged. As shown in FIGS. 1 and 4, each of the cut-away portions 45 is disposed such that they partially uncover the valves 40, 42 even when the communication holes 36c, 38c are blocked by the valves 40, 42. Thus, the cut-away portions 45 always allow the communication holes 36c, 38c to communicate with the valves 36, 38. Accordingly, both ends of the flow channel 30 are in a communicating state with the inlet 12 through the first and second valve chambers 36, 38. When the valves 40, 42 are moved upwards against the biasing force of the springs 39 and serve to block the communication holes 36a, 38a, both ends of the flow channel 30 communicate with the first and second outlets 14, 16 via the first and second valves chambers 36, 38.

In the present embodiment, an insertion hole 44 for the rotary shaft 20 has a diameter larger than that of the rotary shaft 20 of the motor 18 and is formed to extend toward the central portion of the pump chamber 24 from the inlet 12. The distal end of the rotary shaft 20 is attached to the impeller 22 through the insertion hole 44.

Figure 1A:
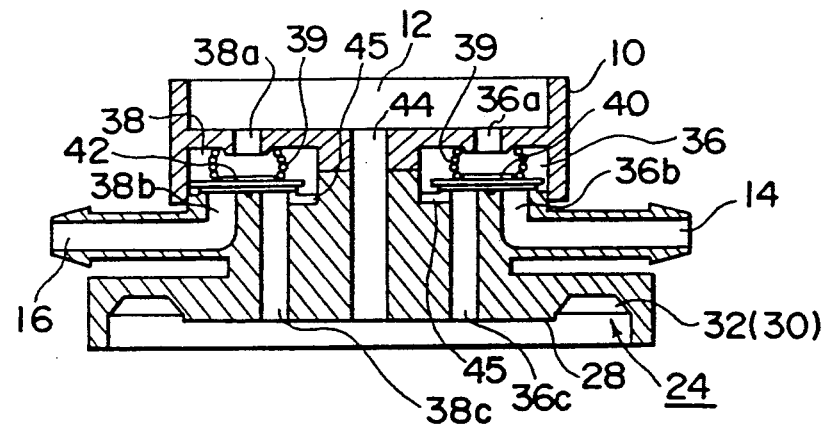
FIG. 1(A) is an enlarged cross-sectional view showing a principal portion of a housing for a washer pump according to a first embodiment of the present invention.
Figure 1B:
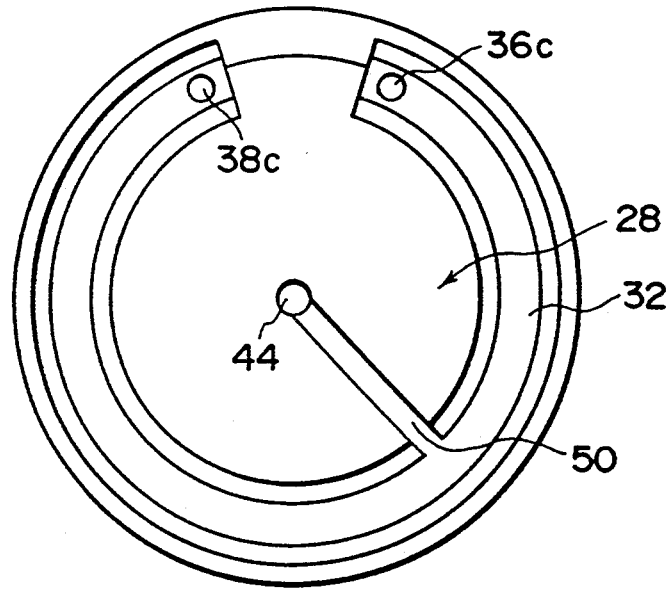
FIG. 1(B) is a bottom view of the principal portion thereof shown in FIG. 1(A)
Figure 1C:
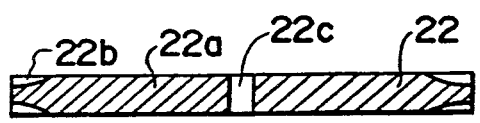
FIG. 1(C) is a cross-sectional view of an impeller.
Figure 1D:
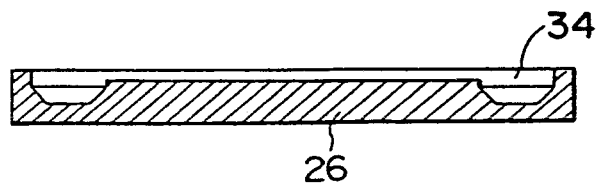
FIG. 1(D) is a cross-sectional view of the lower part of the housing.

As shown in FIG. 1(B), a groove is formed onto the bottom face 28 of the housing 10 in a radial direction of the pump chamber 24 from the insertion hole 44 to provide a bypass flow passage 50. The bypass flow passage 50 reaches a concave groove 32 and hence the washer fluid within the flow channel 30 cannot return to the inlet 12 through the bypass flow passage 50 and the insertion hole 44.

Figure 7:
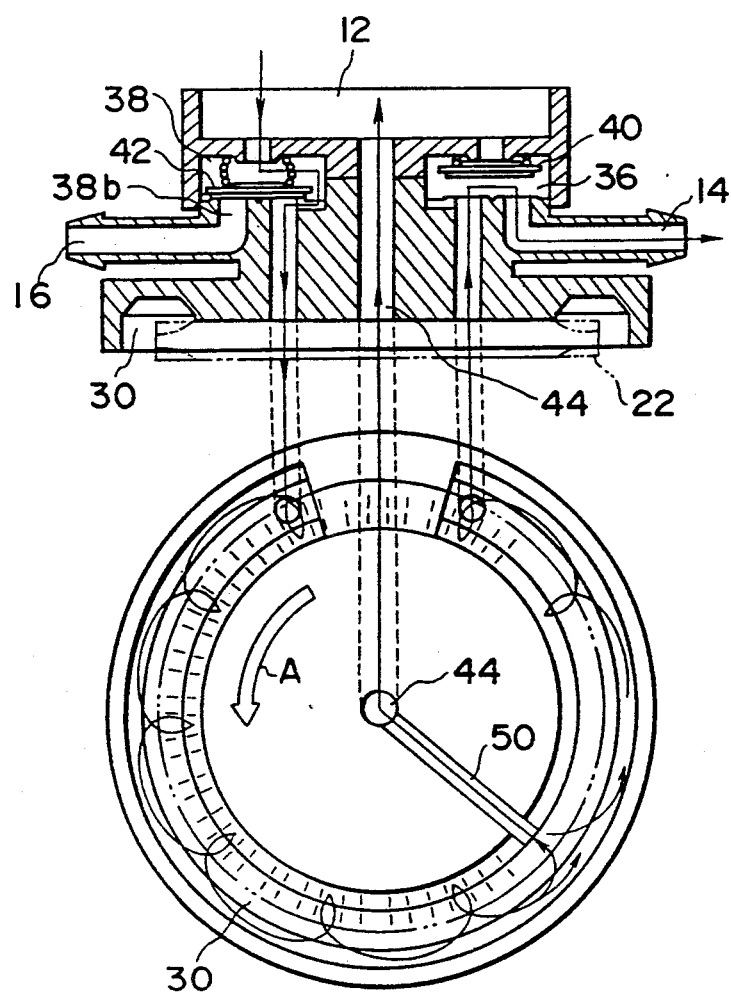
FIG. 7 is a schematic view for describing the flow of washer fluid within a pump in combination with a longitudinal sectional view of the pump and a horizontal sectional view thereof.

A description will now be made of the operation of the present embodiment. To drive the impeller 22 in the forward or reverse direction, the washer fluid flows into the one end of the flow channel 30 from the inlet 12 via either one of the first or second valve chambers 36, 38. After pressure to be exerted on the washer fluid is raised by the rotation of the impeller 22, the washer fluid is selectively expelled from the first outlet 14 or second outlet 16 through either one of the valve chambers 36, 38 which communicate with the other end side of the flow channel 30.

Where it is desired to rotate and drive the impeller 22 in the direction indicated by the arrow A of FIG. 7 by way of example, the washer fluid flows into the one end side of the flow channel 30 from the inlet 12 via the second valve chamber 38. The washer fluid then flows into the flow channel 30 while gradually raising the pressure in the washer fluid by means of Westco groove 22b formed in the outer periphery of the impeller 22, and then proceeds to the first valve chamber 36. In this case, the delivery pressure of the washer fluid has sufficiently been raised. Thus, the valve 40 is forced upwards so as to block the communication hole 36a and the washer fluid is expelled from the first outlet 14 at high pressure under the state as referred to above. At this time, no washer fluid is expelled from the second outlet 16 because the communication hole 38b is blocked by the valve 42 within another valve chamber 38.

On the other hand, when the impeller 22 is driven in the reverse direction, the washer fluid from the inlet 12 is expelled at a sufficiently high delivery pressure from the second outlet 16 via the first valve chamber 36, the flow channel 30 and the second valve chamber 38.

Upon rotation of the impeller 22 in either the forward direction or reverse direction, the pressurized washer fluid within the flow channel 30 is returned to the inlet 12 through the bypass flow passage 50 and the insertion hole 44 for the rotary shaft 20.

In the present invention, the level of the delivery pressure at the first outlet 14 and the second outlet 16 can be set as needed depending on which portion of the flow channel 30 the bypass flow passage 50 is provided.

Figure 8:
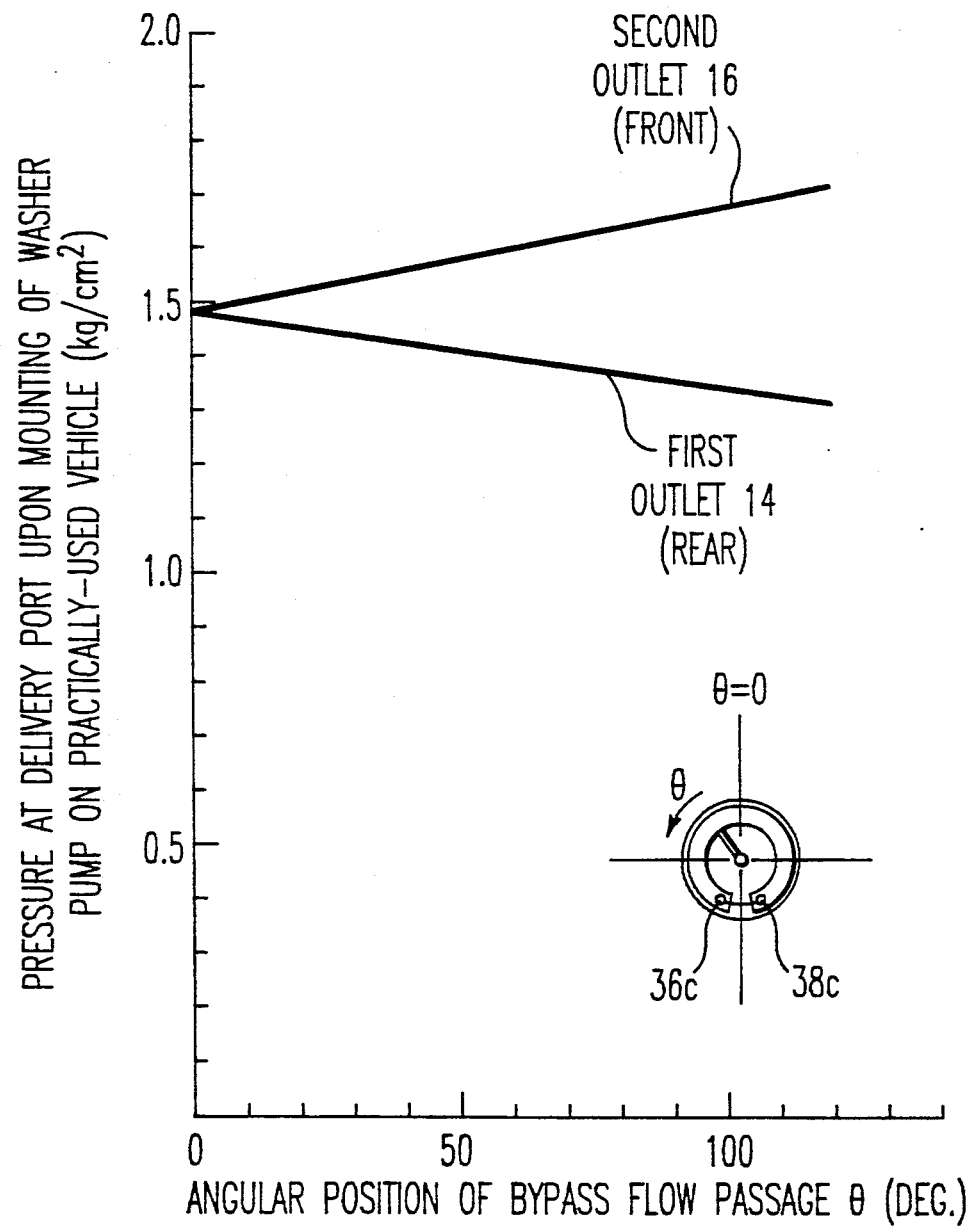
FIG. 8 is a graph for describing the relation between positions where the bypass flow passage is formed in a pump chamber and pressure at an outlet for a flow passage.

FIG. 8 shows observed data of positions of the bypass flow passage vs. pressure at the outlet of the flow passage in the case where the washer pump according to the present embodiment is mounted on a practically-used vehicle. The first and second outlets 14, 16 are connected to the rear and front sides thereof respectively. The observed data shows how the delivery pressure of both of the first and second outlets 14, 16 varies where the central portion of the flow channel 30 is given as $\theta=0$, and the position of the bypass flow passage 50 to be formed gradually approaches the side of the communication hole 36c ($\theta$ is gradually made greater).

As is understood from the same drawing, as the bypass flow passage 50 gradually approaches the side of the communication hole 36c on the side of the first outlet 14, the delivery pressure of the first outlet 14 is reduced and that of the second outlet 16 is increased.

In other words, assuming that the impeller 22 is rotated and driven in one direction and the washer fluid is expelled from the first outlet 14, the pressure exerted on the washer fluid within the flow channel 30 is gradually raised as the washer fluid approaches the communication hole 36c as an outlet. Thus, it is considered that if the bypass flow passage 50 is established at the side closer to the communication hole 36c, i.e., $\theta$ is gradually made larger, the washer fluid delivery rate of the bypass flow passage 50 also increases and hence the delivery pressure of the first outlet 14 is reduced as well.

On the other hand, when the impeller 22 is rotated and driven in the reverse direction in a state of $\theta$ being set to a large value, the washer fluid introduced from the communication hole 36c is bypassed by the bypass flow passage 50 as long as the pressure is reduced. It is therefore considered that the fluid delivery rate of the bypass flow passage 50 is relatively small and the delivery pressure of the second outlet 16 is relatively increased.

According to the present invention, as described above, the difference between the pressure exerted on the washer fluid delivered from the first outlet 14 and that exerted on the washer fluid delivered from the second outlet 16 can arbitrarily be set depending on the position where the bypass flow passage 50 is located. Thus, the washer fluid can be supplied to the front glass at full delivery pressure by means of a single washer pump, whereas the washer fluid can be supplied to the rear glass at an appropriate lower delivery pressure.

The present invention can also bring about an advantageous effect in that any pressure remaining inside the piping arrangement can be released owing to the provision of the bypass flow passage 50 within the pump chamber 24.

In other words, let's here assume that no bypass flow passage 50 is provided in the washer pump illustrated in the present embodiment. At this case, there is often a case where the pressurized washer fluid cannot be expelled due to some reason, for example, the clogging of an injection nozzle through which the washer fluid is fed to the rear glass or the clogging of piping or the like during the supply of the washer fluid to the rear glass from the first outlet 14. When the operation of the pump is stopped under this condition, the following inconvenience will occur. In other words, the washer fluid within the piping flows into the first valve chamber 36 from the first outlet 14 owing to residual pressure in the piping and the valve 40 is forced upwards by that residual pressure, so that the washer fluid flows into the flow channel 30 of the pump chamber 24. The washer fluid is then introduced into the second valve chamber 38 from the flow channel 30 and hence the valve 42 is forced upwards by this residual pressure, so that the washer fluid is expelled from the second outlet 16 to the front glass, thereby causing a problem.

According to the present invention, on the contrary, a bypass passage 50 for introducing the washer fluid which flows into the flow channel 30 into the inlet 12 via the bypass flow passage 50 and the insertion hole 44 for the rotary shaft 20 is formed by providing the bypass flow passage 50 at the flow channel 30. Thus, the present invention brings about an advantageous effect in that the washer fluid can be prevented from being expelled from the second outlet 16 onto the front glass.

Similarly, even when the flow passage on the side of the second outlet 16 is blocked, the washer fluid is prevented from being expelled from the side of the first outlet 14.

Figure 9:
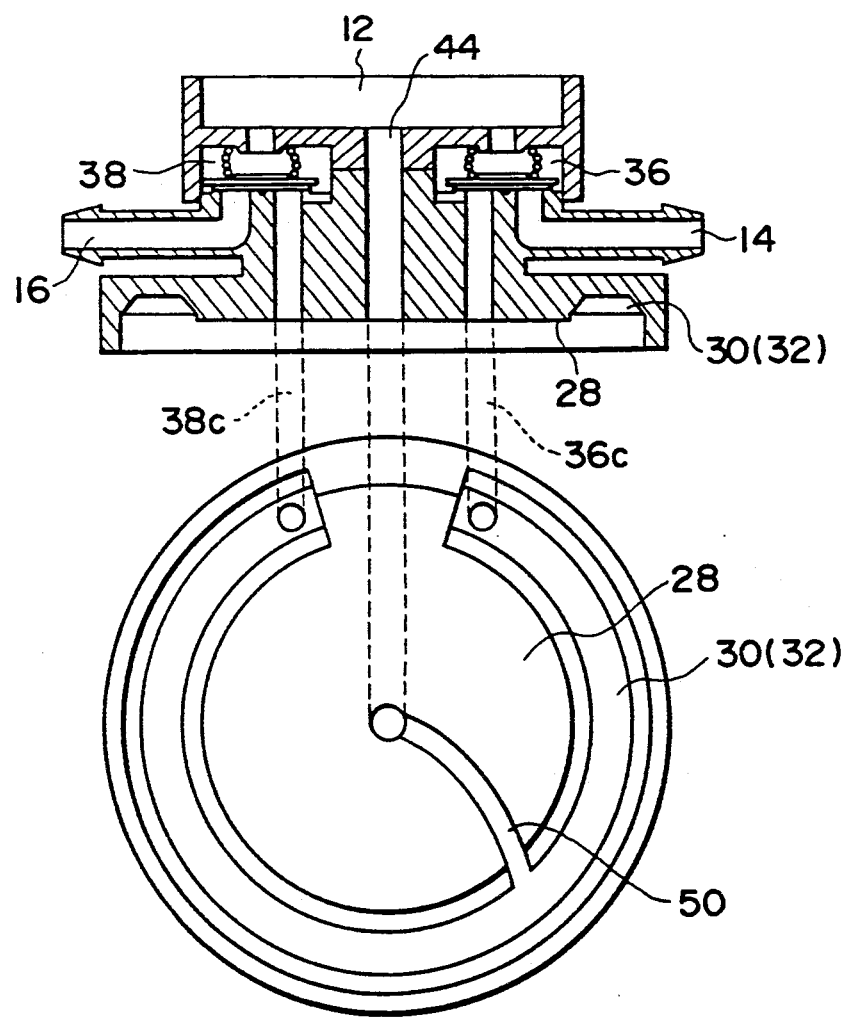
FIG. 9 is a schematic view for describing a modification of the bypass flow passage in association with that depicted in FIG. 7.

Incidentally, a description has been made in the case where the bypass flow passage 50 is defined in the form of a straight line by way of an illustrative example in the present embodiment. The present invention is however not necessarily limited to this embodiment. The bypass flow passage 50 may be inclined with respect to the radial direction of the flow channel 30 or may be defined in the form of a curve as shown in FIG. 9. As a consequence, the difference in the fluid delivery rate between the bypass flow passage 50 and the flow channel 30 can be made greater depending on the flow direction of the bypassed washer fluid which flows within the flow channel 30.

In other words, when the washer fluid flows into the side of the first outlet 14 by using the bypass flow passage 50 shown in the same drawing, the fluid delivery rate of the bypass flow passage 50 can be rendered large and its delivery pressure can also be reduced sufficiently. On the other hand, when the washer fluid is moved toward the second outlet 16, the washer fluid is hadr to flow into the bypass flow passage sage 50 and hence the fluid delivery rate thereof is considerably reduced.

As a consequence, the washer fluid can be extruded from the first outlet 14 in a state of the delivery pressure being fully reduced. In addition, the washer fluid ca be expelled from the second outlet 16 by the delivery pressure borne essentially by the pump itself. It is therefore possible to make use of the performance of the pump itself more effectively.

Figure 10:
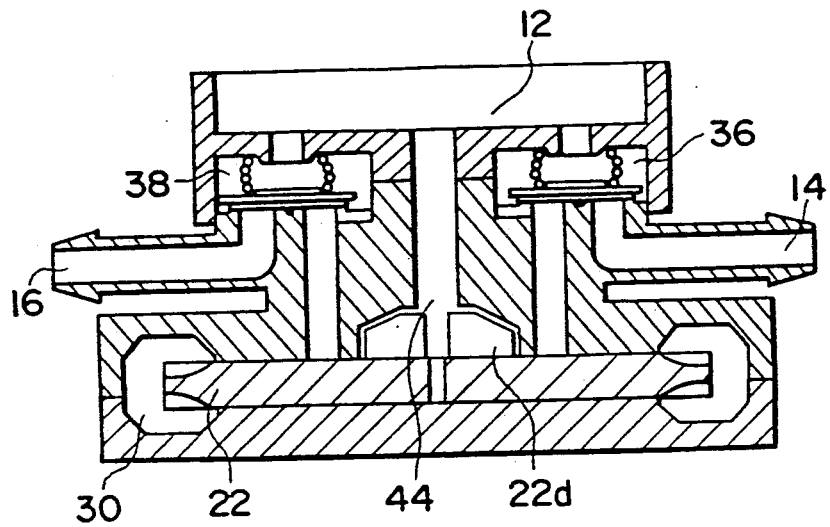
FIG. 10 is an enlarged longitudinal sectional view showing a washer pump according to a second embodiment of the present invention.
Figure 11:
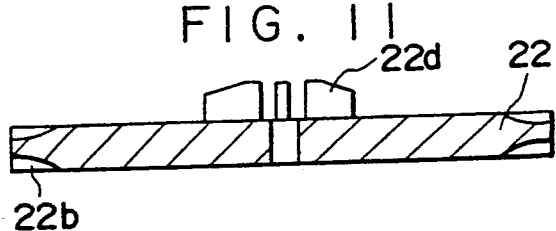
FIG. 11 is a side view illustrating an impeller according to the second embodiment.
Figure 12:
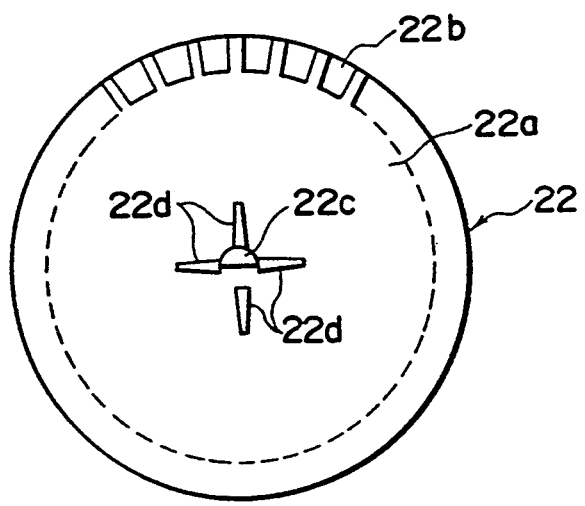
FIG. 12 is a plan view of the impeller of FIG. 11.

FIGS. 10 through 12 show a preferred second embodiment of a washer pump according to the present invention.

As shown in FIGS. 11 and 12, the features of the present embodiment reside in that a plurality of supplemental vanes 22d are centrally provided on the surface of the impeller 22 in radial form and by-passed washer fluid, which is introduced via the bypass flow passage 50, is forced under pressure into the inlet 12 through the insertion hole 44 so as to be effectively discharged from the impeller 22.

In the present embodiment, four supplemental vanes 22d are provided symmetrically with respect to the center of the rotary shaft 20. They may be defined in an arbitrary form and the number of the vanes 22d may be increased or decreased as needed. In addition, if a means for forcibly pressure feeding washer fluid taken from the bypass flow passage 50 to the inlet 12 is used as an alternative to the supplemental vanes, their shapes are not necessarily limited to the vanes.

Figure 13:
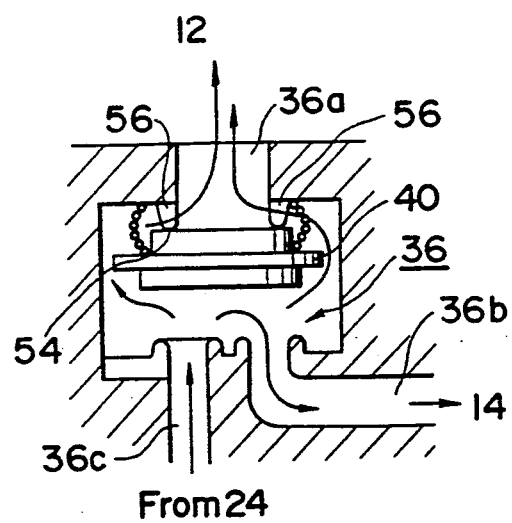
FIG. 13 is a longitudinal sectional view depicting a valve chamber according to a third embodiment of the present invention.

Next, FIG. 13 shows a third embodiment according to the present invention, which corresponds to a modification of the bypass flow passage.

In this embodiment, a pair of cut-away portions 56 are formed in a cylindrical valve seat 54 which is brought into contact with the valve 40 in the first valve chamber 36. The cut-away portions 56 are formed in an opposing relationship to each other respectively with the central axis of the valve seat 54 interposed therebetween. Thus, the first valve chamber 36 communicates with the communication hole 36a via the cutaway portions 56 even when the valve 40 is forced under the pressure exerted on the washer fluid against the valve seat 54 and then brought into tight contact with the same.

Thus, even when the impeller 22 is driven in the forward direction and the valve 40 is forced upwards under the pressure exerted on the washer fluid to thereby deliver the washer fluid from the first outlet 14, part of the washer fluid is by-passed toward the communication hole 36a and the inlet 12 via the cutaway portions 56 and hence the pressure exerted on the washer fluid delivered from the first outlet 14 is reduced. This embodiment can bring about the same advantageous effects as those in the aforementioned embodiment.

In this embodiment, the delivery pressure of the first outlet 14 can be arbitrarily set depending on to what degree the delivery rate of the by-passed washer fluid refluxed to the side of the inlet 12 via the cut-away portions 56 is established.

Figure 14:
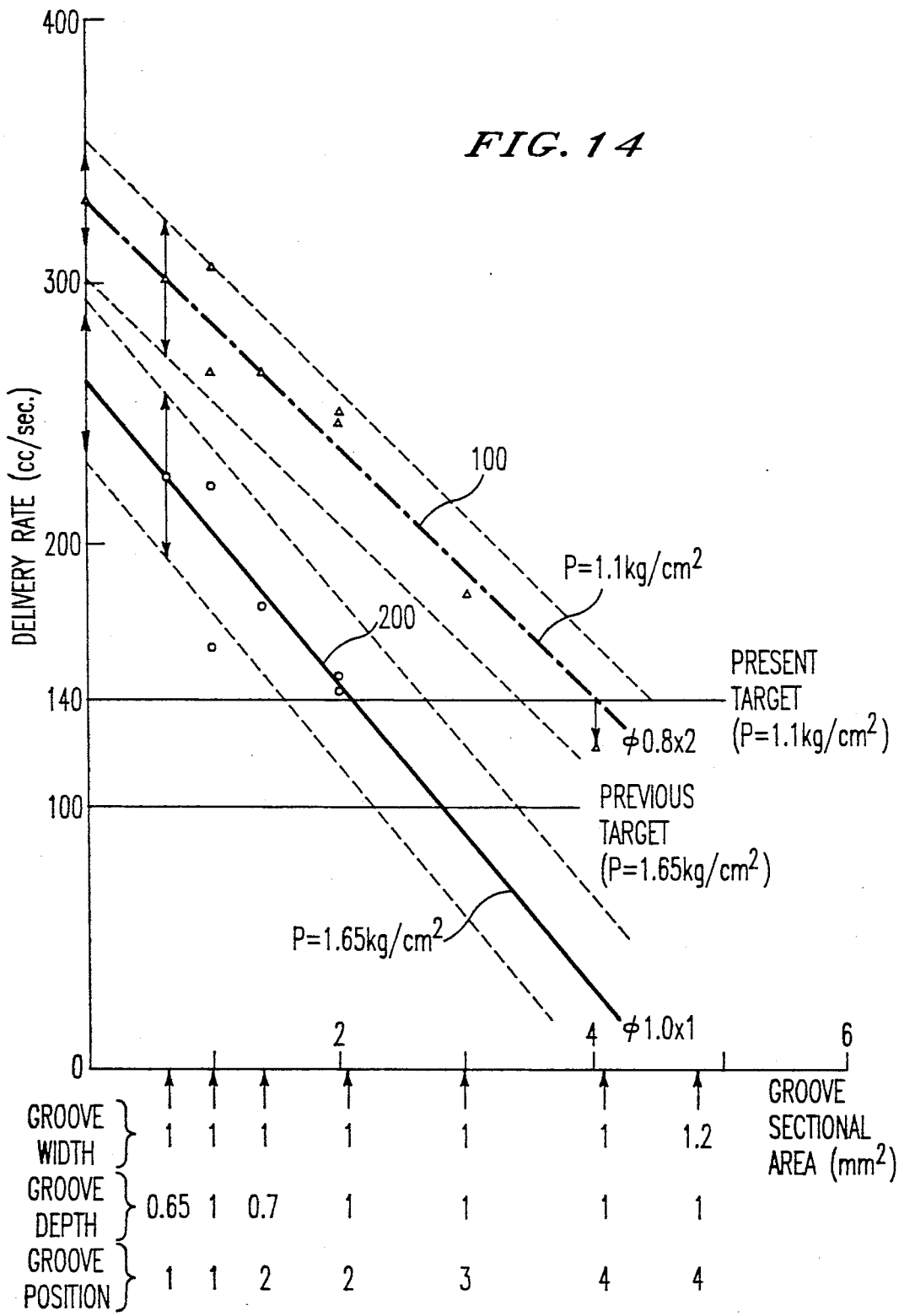
FIG. 14 is a diagram for describing the relation between an open area of the bypass flow passage according to the third embodiment and the quantity of fluid flowing through the bypass flow passage.

FIG. 14 depicts observed data of the aperture area vs. the fluid delivery rate in the case where the washer pump according to the present embodiment is actually mounted on a vehicle and the first and second outlets 14, 16 are connected to the rear and front sides thereof respectively.

The observed data shows how the delivery rate of the washer fluid supplied to the rear side from the first outlet 14 is reduced as the sectional area of the cut-away portions 56 indicated by the abscissa axis in the drawing is gradually increased provided that the delivery pressure of the pump chamber 24 is constant.

Observed data indicated by numeral 100 in the same drawing shows where the first outlet 14 is coupled to orifices each of which has a diameter of 0.8 mm. This data also shows that the groove sectional area is 4 mm$^2$ in order to adjust the delivery pressure to 1.1 kg/cm$^2$ (140 cc/10 sec. in the case of the fluid delivery rate). Observed data indicated by numeral 200 in the same drawing shows where the first outlet 14 is connected to an orifice which has the diameter of 1.0 mm and also indicates that the sectional area is about 2.8 mm$^2$ with a view toward adjusting the delivery pressure to 1.65 kg/cm$^2$ (100 cc/10 sec. in the case of the fluid delivery rate). As is apparent from the same drawing, when the cross section of each of the cut-away portions 56 is made large and the delivery rate of the by-passed washer fluid is increased, the delivery rate of the washer fluid supplied to the rear side from the first outlet 14 is gradually reduced and at the same time, the delivery pressure exerted on the washer fluid is also reduced.

On the other hand, the second valve chamber 38 employed in the present embodiment is so formed that the communication hole 38a thereof is completely blocked with the valve 42.

Thus, when the impeller 22 is rotated and driven in the reverse direction and the washer fluid is supplied to the second valve chamber 38 from the pump chamber 24, the washer fluid is supplied to the front side from the second outlet 16 with high pressure exerted thereon.

The present embodiment is similar to the aforementioned embodiment in that any pressure which remains within the piping can be released by providing, as a bypass flow passage, each of the cut-away portions 56 within the first valve chamber 36.

The cut-away portions 56 are formed onto the valve seat 54 for the purpose of the bypass in the present embodiment. However, cut-away portions are formed at a portion where the valve 40 is brought into contact with the valve seat 54 so as to communicate with the communication hole 36a, whereby they may be used for the purpose of the bypass.

Figure 15:
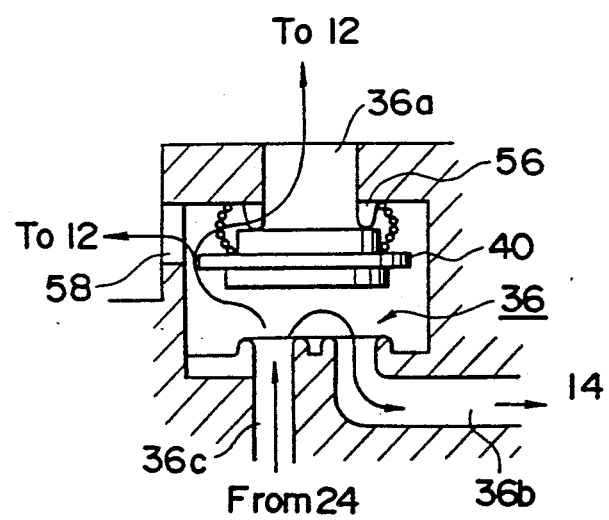
FIG. 15 is a longitudinal sectional view of a valve chamber according to a fourth embodiment of the present invention.

Incidentally, a description has been made in the case where the cut-away portions 56 are only formed as the bypass flow passage within the first valve chamber 36 by way of an illustrative example in the present embodiment. However, the present invention is not necessarily limited to this embodiment. A bypass window 58 communicating with the inlet 12, which is other than the cut-away portions 56 may be provided as needed as shown in FIG. 15 by way of example. Thus, the delivery rate of the by-passed washer fluid, which flows toward the first outlet 14, can be made greater and at the same time, the delivery pressure of the washer fluid from the first outlet 14 can be rendered lower.

As an alternative to the cut-away portions 56, the bypass window 58 may be formed as the bypass flow passage as needed in the present invention.

The present invention is not necessarily limited to each of the aforementioned embodiment and many changes and modifications can be made thereto without departing from the spirit and scope of the invention as set forth herein.

A description has been made of the washer pump of the Westco type by way of an illustrative example in each of the embodiments described above. However, needless to say, pumps other than this washer pump, such as a Pelton pump, a washer pump of the gear pump type, etc. are applicable in the present invention.

In addition, a description has been made in the case where the washer fluid is supplied to the front and rear glasses using the washer pump by way of an illustrative example in the aforementioned embodiments. However, it is needless to say that any positions other than the front and rear glasses, to which the washer fluid is supplied, are also applicable as needed.

What is claimed is:

1. A washer pump for supplying washer fluid to vehicle windglasses, comprising:
    pressurized means serving to pressurize the washer fluid from a washer fluid supply source so as to deliver the same therefrom and capable of changing the delivery of the washer fluid in two directions;
    a first valve operative to be opened according to the delivery of the pressurized washer fluid from said pressurized means to one of said both directions for introducing the pressurized washer fluid onto a first widow glass;
    a second valve operative to be opened according to the delivery of the pressurized washer fluid from said pressurized means to the other thereof for introducing the pressurized washer fluid to a second window glass; and
    bypass means for taking out part of the pressurized washer fluid delivered in said one direction and for reducing the delivery rate of the pressurized washer fluid to the first window glass below that of the pressurized washer fluid to the second window glass.

2. A washer pump according to claim 1, wherein said pressurized means includes a pump chamber and a rotating means operative to be rotated therein for pressurizing the washer fluid, and serving to change the delivery of the washer fluid in two directions according to the rotation of said rotating means in either one or other direction.

3. A washer pump according to claim 2, wherein one end of a bypass flow passage formed within said pump chamber is used as a first outlet for delivering the washer fluid in said one direction, which communicates with said first valve, whereas the other end thereof is employed as a second outlet for delivering the washer fluid in said other direction, which communicates with said second valve, and said bypass means is formed in an open state at the intermediate portion of said flow passage, which is closer to said first outlet, so as to take out the washer fluid therefrom.

4. A washer pump according to claim 3, wherein said bypass flow passage is formed to return said taken-out washer fluid to said washer fluid supply source.

5. A washer pump according to claim 3, wherein when the washer fluid is supplied to one of the window glasses through one of said first or second valves, the other thereof is formed with an opening for supplying the washer fluid from said washer fluid supply source into said pump chamber.

6. A washer pump according to claim 5, wherein said first and second valves serve to block a section between said pump chamber and injection nozzles provided adjacent to the window glasses but to allow said washer fluid supply source to communicate with said pump chamber, in a state in which the washer fluid is free from being force-fed under pressure from said pump chamber.

7. A washer pump according to claim 6, wherein said first and second valves serve to introduce the washer fluid into said injection nozzles according to the supply of the pressurized washer fluid from said pump chamber and to block washer fluid outlets and said washer fluid supply source.

8. A washer pump according to claim 7, wherein said first and second valves are brought into tight contact with said washer fluid outlets by means of elastic members respectively and separated from said washer fluid outlets by means of the pressurized washer fluid delivered from said pump chamber.

9. A washer pump according to claim 7, wherein said bypass flow passage serves to return the taken-out washer fluid to a section between said first valve and said washer fluid supply source and that between said second valve and said washer fluid supply source.

10. A washer pump according to claim 9, wherein said bypass flow passage is provided with means for pressurizing the taken-out washer fluid so as to return the same to the side of said washer fluid supply source.

11. A washer pump according to claim 10, wherein said means for pressurizing the removed washer fluid is rotated together with said rotating means within said pump chamber.

12. A washer pump according to claim 3, wherein said bypass flow passage inclines in the radial direction of said pump chamber and is designed to make it easy to introduce the washer fluid into said first outlet and to make it hard to introduce the same into said second outlet.

13. A washer pump according to-claim 1, wherein said bypass means is a cut-away portion formed onto a valve seat which is brought into contact with said first valve or onto said first valve in order to return part of the pressurized washer fluid to said washer fluid supply source upon opening of said first valve.

14. A washer pump according to claim 1, wherein said bypass means is provided at a guide passage formed between said pump chamber and each of said washer fluid injection nozzles provided adjacent to the window glasses, and functions as a communication passage for causing said guide passage to communicate with said washer fluid supply source at all times.

15. A pump for selectively delivering fluid in two directions, comprising:
    a housing for forming a pump chamber;

an impeller rotatable in either one or other direction and including a flow passage formed in said pump chamber to thereby pressurize the fluid;

first valve means serving to communicate with one end of said flow passage and also allow said flow passage to communicate with a fluid supply source where the pressurized fluid from said flow passage is absent, and serving to block a first guide passage to be connected to a first portion to be supplied with fluid and also to block said flow passage from said fluid supply source where the pressurized fluid from said flow passage is present, to thereby perform communication with said first guide passage and said flow passage;

second valve means serving to communicate with the other end of said flow passage and also allow said flow passage to communicate with said fluid supply source where the pressurized fluid from said flow passage is absent, and serving to block a second guide passage to be connected to a second portion to be supplied with fluid and also to block said flow passage from said fluid supply source where the pressurized fluid from said flow passage is present, to thereby perform communication with said second guide passage and said flow passage; and bypass means serving to allow part of said flow passage to communicate with said fluid supply source and to return, to said fluid supply source, fluid of quantities much larger than that returned at the time of the rotation of said impeller in the other direction upon rotation of said impeller in the one direction.

16. A pump according to claim 15, wherein said bypass means serves to allow a portion adjacent to said first valve means rather than said valve means to communicate with said fluid supply source.

17. A pump according to claim 15, wherein said bypass means makes an oblique angle in the radial direction of said impeller and communicates with said flow passage.

18. A pump for selectively delivering fluid in two directions, comprising:

a housing for forming a pump chamber;

an impeller rotatable in either one or other direction and including a flow passage formed in said pump chamber to thereby pressurize the fluid;

first valve means serving to communicate with one end of said flow passage and also allow said flow passage to communicate with a fluid supply source where the pressurized fluid from said flow passage is absent, and serving to block a first guide passage to be connected to a first portion to be supplied with fluid and also to block said flow passage from said fluid supply source where the pressurized fluid from said flow passage is present, to thereby perform communication with said first guide passage and said flow passage;

second valve means serving to communicate with the other end of said flow passage and also allow said flow passage to communicate with said fluid supply source where the pressurized fluid from said flow passage is absent, and serving to block a second guide passage to be connected to a second portion to be supplied with fluid and also to block said flow passage from said fluid supply source where the pressurized fluid from said flow passage is present, to thereby perform communication with said second guide passage and said flow passage; and bypass means provided between said pump chamber and said first portion to be supplied with fluid and serving to return, to said fluid supply source, part of the fluid to be force-fed under pressure upon rotation of said impeller to the one direction.

19. A pump according to claim 18, wherein said bypass means is formed in said first valve means and is an opening for maintaining communication with said flow passage and said fluid supply source where the pressurized fluid from said flow passage is present.

20. A pump according to claim 18, wherein said bypass means allows a valve chamber for said first valve means to communicate with said fluid supply source at all times.

* * * * *